F. B. Hooper
INVENTOR.

Patented June 1, 1943

2,320,930

UNITED STATES PATENT OFFICE 2,320,930

SCUPPER VALVE

Frank B. Hooper, Newport News, Va.

Application December 28, 1942, Serial No. 470,367

2 Claims. (Cl. 251—135)

This invention relates to valves, and particularly to scupper valves, the primary object of the invention being to provide a scupper valve constructed in such a way that with each movement of the valve to its closed position, the valve will be rotated against its seat, which is located above the valve, cleaning foreign matter from the valve seat and valve, and insuring the true seating of the valve at all times to accomplish the purpose of the invention.

An important object of the invention is to provide a scupper valve of the ball type which is constructed in such a way that the valve discharge to the sea, is through the full area of the pipe, free of obstructions which would restrict the flow of material through the valve.

A further object of the invention is to provide a ball valve which will be rotated by the weight of foreign matter collecting thereon, exposing a smooth clean surface to a position for engaging the valve seat.

A still further object of the invention is to provide a scupper valve of the ball type which will seat well in advance of the water level within the valve housing, thereby creating an air cushioning effect, preventing any possibility of the water returning, and eliminating the cause of water hammering, with the result that the strain and wear on the valve is reduced to the minimum.

Still another object of the invention is to provide a scupper valve which may be installed in an opening in the ship's shell, the opening being of a smaller diameter than required for the installation of the well known flap valve, and further preventing injury which frequently occurs with stuck flap valves projecting beyond the shell plating of the ship.

Another object of the invention is to provide a scupper valve having means for manually moving and holding the valve thereof to its seat, the ball valve moving means being of a construction so that it may be operated to force the ball valve from the valve housing, when the cover has been removed, thereby facilitating repair of the valve, when the valve is located in confined areas.

Another object of the invention is to provide a scupper valve wherein the ball valve will be moved laterally into a compartment formed in the cover of the valve casing, the ball valve being retained in such position, under normal conditions, to insure against the ball valve obstructing or retarding the natural flow of discharge through the valve casing.

Another important object of the invention is to provide manually controlled means for moving the ball valve to its seat, should it become desirable to close the valve.

A further object of the invention is to provide a guide adapted to permit such lateral movement of the ball valve, but which will operate to pick up the ball and direct it inwardly to its seat when the manually controlled means is used in seating the valve.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing

Figure 1:
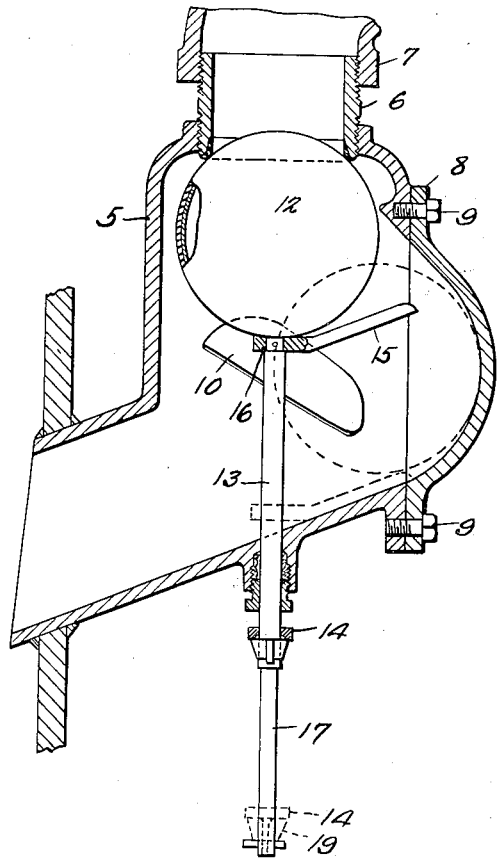
Figure 1 is a vertical sectional view through a scupper valve constructed in accordance with the invention.
Figure 2:
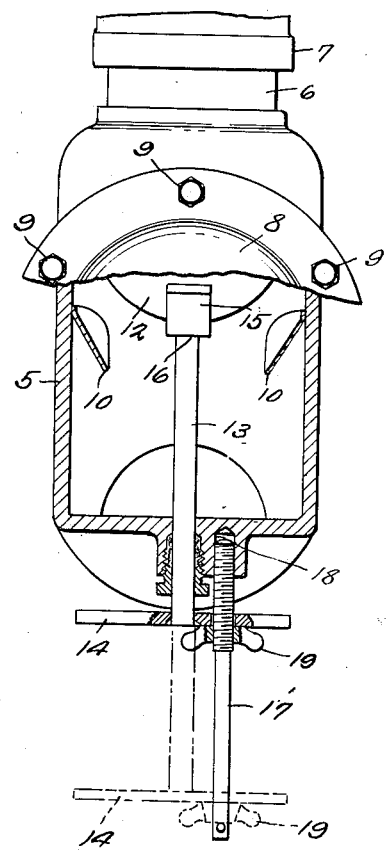
Figure 2 is a fragmental sectional view through the valve body, taken at right angles to Figure 1.
Figure 3:
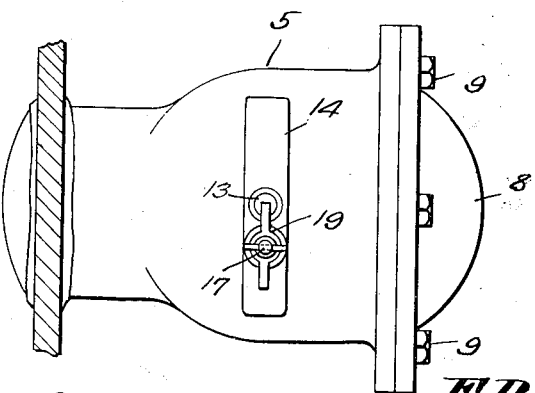
Figure 3 is a bottom plan view of the scupper valve.

Referring to the drawing in detail, the valve body is indicated generally by the reference character 5, and as shown is preferably constructed from standard sized pipe material. One end of the valve body 5 is formed with a threaded opening into which the nipple 6 connected with the inlet pipe 7 extends, the inner edge of the end of the nipple 6 that extends into the body portion 5, being beveled providing a valve seat. One side of the valve body is cut away providing an entrance opening to the valve body, to permit of ready access to the interior of the valve body to facilitate repairs or replacement of the ball valve.

The reference character 8 designates the cover of the valve, which is secured over the entrance opening of the valve, by means of the bolts 9, the cover 8 being slightly bulged providing a chamber out of the path of discharge flow of material through the valve, so that the ball valve may rest therein and be maintained clear of the path of travel of material passing through the valve housing.

Arranged within the body portion and welded to the side wall thereof, are substantially wide spaced plates 10, which plates are downwardly inclined towards the entrance opening in the side of the body portion, to the end that the ball valve, which is indicated at 12 will tend to gravitate away from the valve seat, as the water level within the valve body is lowered.

An outlet opening is formed near the bottom of the valve body, with the result that material may pass readily through the body portion and exhaust through an opening formed in the shell of the ship, with which the scupper valve is used.

It might be further stated, that the ball valve 12 which is hollow to float within the body portion, is coated with "Neoprene," or a material having many of the physical properties of rubber. The valve seat is coated with a non-ferrous metal or "Neoprene" with the result that the valve and valve seat will be maintained in true form to insure the operation of the valve.

The ball valve which possesses the characteristics of a float is constructed of such material that the ball valve will be exceptionally light, due consideration being given to the strength and durability of the valve, in selecting the material from which it is constructed. Because the valve is exceptionally light, it is obvious that the valve will seat well in advance of the water level in the valve body, reaching the valve seat, and that the valve will rotate readily when material is deposited on the upper surface thereof, the material overbalancing the valve to cause a swirling of the valve to free the material therefrom.

It might be further stated that because of the construction of the valve body and ball valve, the wash from the sea will tend to rotate the valve maintaining it clean to further insure its true seating and prevent water from the sea, entering the ship, through the scupper valve. As clearly shown by Figure 1 of the drawing, it will be seen that the area of the valve body is about three times larger than the area of the inlet opening from the sea. This construction insures a slow and easy and reliable seating of the ball valve.

The inlet pipe which is connected with the body portion, may be of any desired length and may be equipped with any desired securing plate, for bolting the valve in position.

The spaced plates 10 which provide a guide and a support for the ball valve, retard the flow of water from the sea, by breaking the force of the sea, eliminating the cause of water hammering.

The reference character 13 designates the valve-operating rod, by means of which the ball 12 may be manually moved to its seating position, as shown by Figure 1 of the drawing. The rod 13 extends through an opening in the bottom of the valve housing which is supplied with suitable packing to maintain a water-tight connection between the rod and opening. A handle indicated at 14 provides means whereby the rod may be forced upwardly against the ball valve. Extending laterally and slightly upwardly from the upper end of the rod 13, is an arm 15 which is of a length to extend into the chamber formed by the cover 8 well under the ball valve. This arm 15 extends from the head 16 formed at the inner end of the rod 13, the head 16 being slightly cupped to accommodate the ball valve and provide a rest to insure the true seating of the ball valve under all conditions.

In order that the rod may be held in its active or valve-supporting position, a bolt 17 having a threaded portion is provided which bolt extends through an opening in the handle 14, the threaded portion of the bolt being fitted in the threaded opening 18 of the valve housing. It will be also noted that the threaded bolt will provide means to insure against the rod 13 rotating to a position where the arm 15 will be out of contact with the ball valve to defeat the purpose of the arm 15.

Positioned on the bolt 17 is a wing nut 19 which is adapted to be moved upwardly to engage the threads of the bolt 17, whereupon the wing nut is rotated to engage the handle 14, securely holding the valve to its seat.

Having thus described the invention, what is claimed is:

1. A scupper valve comprising a body portion having an inlet opening providing a valve seat, and having a lateral valve chamber, a ball valve operating within the body portion and adapted to engage the valve seat closing the inlet opening, said valve adapted to normally lie in the lateral valve chamber, valve operating means comprising a rod slidable through an opening in the wall of the body portion coaxially with said inlet opening, an arm extending laterally from the rod and being normally disposed within the chamber, said arm adapted to engage and move the ball valve inwardly to a position over the end of said rod when the rod is moved upwardly towards said valve seat.

2. A scupper valve comprising a body portion having an inlet opening providing a valve seat, said body portion having a lateral valve chamber, a ball valve operating within the body portion, means for directing the ball valve laterally into said valve chamber, a slide rod operating through the wall of the body portion coaxially with said inlet opening, an arm extending laterally from the upper end of the rod and adapted to engage the ball valve, said arm adapted to move the ball valve to a position over the end of said rod when the rod is moved upwardly, and means for securing the slide rod in its valve supporting position.

FRANK B. HOOPER.